(12) United States Patent
Luther et al.

(10) Patent No.: US 8,167,428 B2
(45) Date of Patent: May 1, 2012

(54) APPLICATOR FOR AN OPHTHALMOLOGIC TREATMENT DEVICE

(75) Inventors: Egon Luther, Jena (DE); Martin Wiechmann, Jena (DE); Diego Zimare, Pausa (DE); Jörg Heinrich, Jena (DE)

(73) Assignee: Carl Zeiss Meditec AG, Jena (DE)

( * ) Notice: Subject to any disclaimer, the term of this patent is extended or adjusted under 35 U.S.C. 154(b) by 0 days.

(21) Appl. No.: 12/776,099

(22) Filed: May 7, 2010

(65) Prior Publication Data

US 2010/0277695 A1 Nov. 4, 2010

Related U.S. Application Data

(63) Continuation-in-part of application No. PCT/EP2008/009364, filed on Nov. 6, 2008.

(30) Foreign Application Priority Data

Nov. 7, 2007 (DE) .......................... 10 2007 053 387

(51) Int. Cl.
*A61B 3/10* (2006.01)
*A61B 3/14* (2006.01)
(52) U.S. Cl. ........................................ 351/221; 351/206
(58) Field of Classification Search ........... 351/200–246
See application file for complete search history.

(56) References Cited

U.S. PATENT DOCUMENTS

| 4,867,554 | A | 9/1989 | Matsumura |
|---|---|---|---|
| 5,428,438 | A * | 6/1995 | Komine ................ 356/5.01 |
| 6,608,674 | B2 | 8/2003 | Gerlach et al. |
| 7,102,752 | B2 * | 9/2006 | Kaylor et al. ............. 356/445 |
| 7,370,966 | B2 * | 5/2008 | Fukuma et al. ............. 351/205 |
| 7,905,596 | B2 * | 3/2011 | Aoki et al. ................ 351/206 |
| 2002/0012099 | A1 | 1/2002 | Miwa et al. |
| 2004/0189939 | A1 | 9/2004 | Dick et al. |
| 2004/0252276 | A1 | 12/2004 | Nanjo et al. |

FOREIGN PATENT DOCUMENTS

| DE | 198 16 302 C1 | 11/1999 |
|---|---|---|
| DE | 100 31 414 A1 | 1/2002 |
| EP | 0 595 788 A2 | 5/1994 |
| EP | 0 669 819 B1 | 8/2002 |
| EP | 1 797 816 A2 | 6/2007 |
| GB | 2 020 846 A | 11/1979 |
| WO | WO 03/003909 A2 | 1/2003 |

* cited by examiner

*Primary Examiner* — Mohammed Hasan
(74) *Attorney, Agent, or Firm* — Patterson Thuente Christensen Pedersen, P.A.

(57) ABSTRACT

An applicator for an ophthalmologic treatment or diagnostic device, wherein a laser beam and an illumination beam are directed at the eye and light reflected from the eye is fed to an examining beam path. A reflective surface is provided for the reflection of the illumination beam and comprises an optical aperture for the laser beam.

21 Claims, 2 Drawing Sheets

APPLICATOR FOR AN OPHTHALMOLOGIC TREATMENT DEVICE

PRIORITY CLAIM

This application is a continuation-in-part of International Application PCT/EP2008/009364, with an international filing date of Nov. 6, 2008, which claims priority to German Patent Application 10 2007 053 387.1, filed Nov. 7, 2007, the contents of both are hereby incorporated herein by reference.

FIELD OF THE INVENTION

The invention relates to an applicator for an ophthalmologic treatment device, with which a laser beam and an illumination beam are directed at the eye and light reflected from the eye is fed to an examining beam path.

BACKGROUND

In ophthalmological therapy for the eye with laser light, the frequent demand arises for combining a laser impact beam and an object illumination and to direct them at the eye. In the event that the laser impact beam exhibits a wavelength outside the visual range of the spectrum, an additional visible aiming beam must be directed coaxially with the impact beam toward the eye in order to mark the location of the effect of the impact beam for the physician.

Since the illumination light should be transferred into the eye as complete as possible and without color distortion, substantial efforts have been required for such a combining of beams. For example, in DE 198 16 302 a beam splitter/recombiner is equipped with special reflection coatings in order to join the various wavelengths of the laser light and/or illumination light. Said coatings have a complicated structure and are difficult to manufacture, particularly when laser lights of varying wavelengths (e.g., 488 nm, 514 nm, 532 nm, 561 nm, 635 nm, and 659 nm, as commonly used in applied ophthalmology) are to be applied. Since the coatings have to be permeable at least for the wavelengths designated for the lasers, distortions of the illumination light occur because said wavelengths are not reflected.

Therefore, U.S. Pat. No. 6,394,603 suggests the use of a polarization beam splitter/recombiner with appropriate reflection coatings. This device is also difficult to manufacture and, furthermore, special demands are put on the light sources and optical elements within the beam path in order to produce and/or maintain the respective polarization.

In DE 100 31 414 of the applicant, a solution is described which forgoes the elaborate coating of the beam recombiner, whereby a plane parallel plate is used which is positioned at the Brewster's angle to the incident laser beam. However, this solution also works solely for polarized light and therefore exhibits the same disadvantages as the one previously described.

SUMMARY OF THE INVENTION

Therefore, it is the task of the invention to describe a simple assembly for combining a laser beam with an illumination beam which largely avoids particularly the distortion of the color of the illumination light.

Unexpectedly, the inventors realized that a complicated coating structure for the reflection coating is not required, instead, it suffices to let a laser beam pass through an optical aperture in the reflection coating. Thereby, said optical aperture can be a hole which is, preferably, designed elliptically. Alternatively, an appropriate area of the reflection coating can also be left uncoated.

Since said optical aperture can be permeated by any wavelengths, no adjustments or other precautions for various wavelengths are required.

Therefore, the solution is also particularly applicable if the illumination light is created by an LED, particularly, a white light LED, since contrary to a halogen lamp, it omits only a limited spectrum, which would be further distorted through the customary reflection coatings.

In another aspect of the invention there is provided an Indirect Ophthalmoscope, comprising a light emitting diode (LED) or any other light source to produce an illumination light, a mirror with an optical aperture, and a socket for a connector to an optical fiber, wherein the mirror is arranged to combine coaxially the illumination light and the laser light from the optical fiber guided through the optical aperture.

BRIEF DESCRIPTION OF THE DRAWINGS

In the following, the invention shall be further explained by means of the schematic drawings.

DETAILED DESCRIPTION

Figure 1:
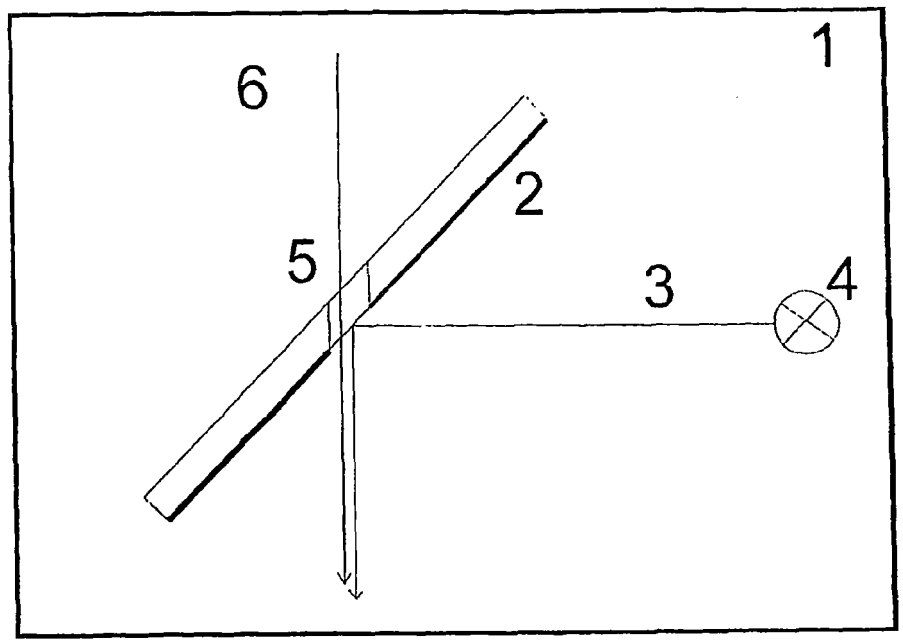
FIG. 1 is a schematic view of an embodiment in accordance with the invention with the optical aperture in the form of a hole.

In FIG. 1, an applicator 1 with mirror 2 for the illumination light 3 of an illumination light source 4 (for example, a white light LED) is tilted at 45° toward the beam path of the illumination light 3. The mirror 2 exhibits a hole 5, through which the laser beam 6 passes and combines with the illumination light 3, which is reflected from the mirror 2, and is directed at the eye not shown here.

Figure 2:
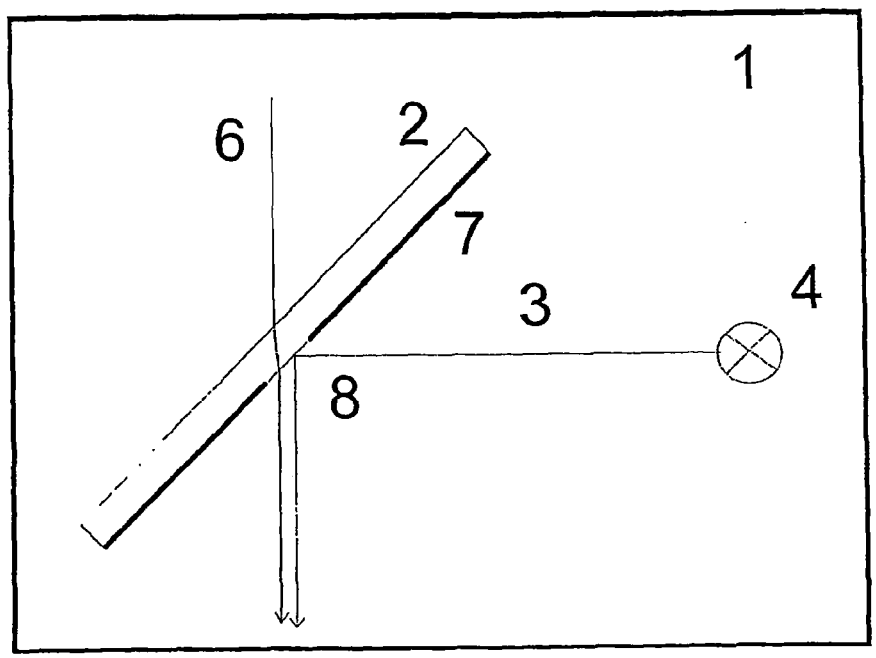
FIG. 2 is a schematic view of an embodiment in accordance with the invention with a blank area in the reflection coating.

FIG. 2 also shows a mirror 2 for the illumination light 3. Herein, the optical aperture for the laser beam 6 is realized in such a way that the reflection coating 7 exhibits an uncoated area 8, through which the laser beam 6 passes and combines with the illumination light 3.

In both drawings, the laser beam 6 is shown as a free beam; alternatively, it can also be brought to the location of the optical aperture by means of an optical fiber.

Preferably, the optical aperture exhibits a diameter which corresponds with or is slightly greater than the diameter of the laser beam 6 at the location of the aperture in order to avoid e.g., adjustment problems, shadings, or diffractions.

The portion of the illumination light 3 which is not reflected onto the eye through the optical aperture is not apparent to the operator since it is filled in by the laser beam 6. Said point or spot in the laser color, and/or black in case of a switched off or invisible laser beam, can also be used effectively as guidance.

With the current complete illumination of the eye fundus with white light, the aiming beam is frequently difficult to distinguish on the reddish retina. The black spot caused by the optical aperture significantly increases the contrast of the ordinarily red laser pointer. This simplifies aiming and increases the safety of the treatment.

Figure 3:
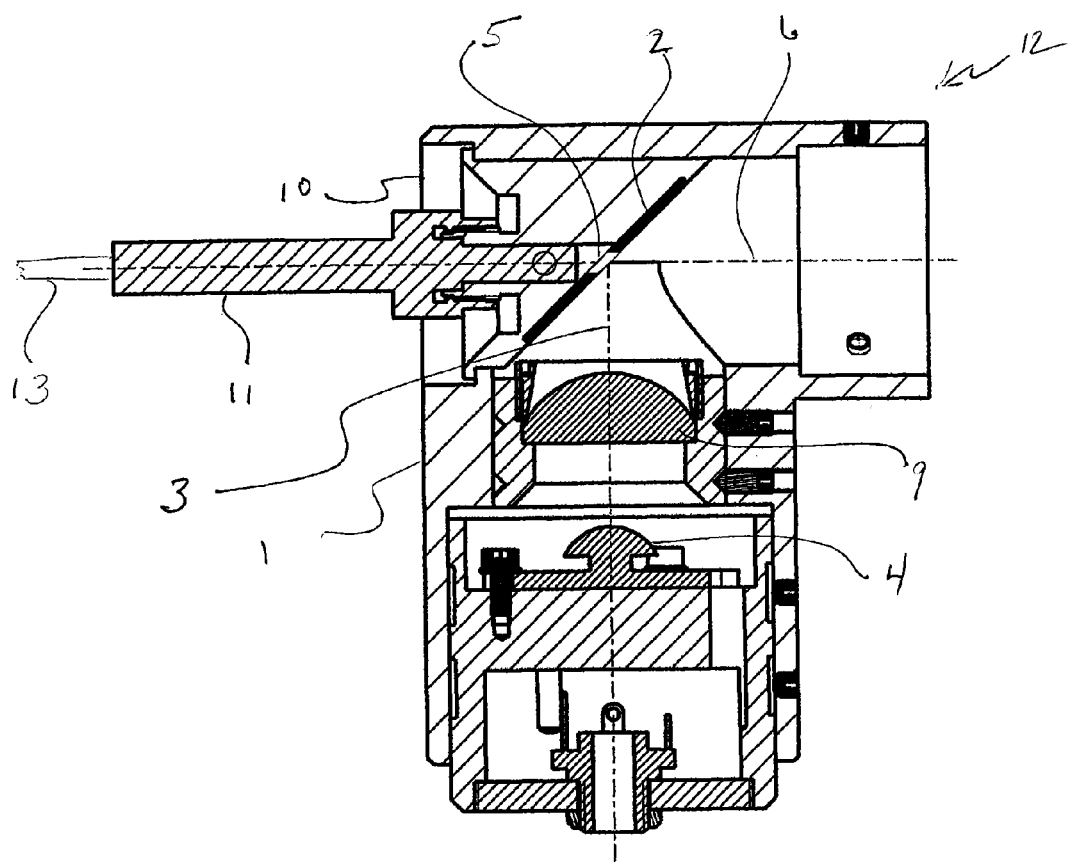
FIG. 3 is a sectional view of an indirect ophthalmoscope in accordance with an embodiment of the invention.

In FIG. 3, the applicator 1 is presented in the form of indirect ophthalmoscope 12. Indirect ophthalmoscope 12 comprises a mirror 2 with an optical aperture 5, a LED 4, a lens 9 to project the illumination light 3 from the LED 4 to the mirror 2 and a socket 10 adapted to receive connector 11 to an optical fiber 13. The light of a treatment laser is transmitted via optical fiber 13 and the connector 11 to the applicator and guided through the aperture 5 of the mirror 2 to be coaxially combined with illumination light 3 and to form a laser beam 6 in the center of an illuminated field directed to the eye of the patient. In one example embodiment, LED 4 is a white light LED. Connector 11 for optical fiber 13 can be of any suitable type, for example SMA or SMC. When the laser is switched off a dark spot is apparent in the center of the illuminated field, which can be used as guidance to direct the laser beam to the part of the fundus of the eye that needs treatment. After switching on the treatment laser the treatment beam is directed exactly to that point.

Although the present invention has been described with reference to the preferred embodiments, workers skilled in the art will recognize that changes may be made in form and detail without departing from the spirit and scope of the invention.

The invention claimed is:

1. An applicator for an ophthalmologic treatment device, wherein at least one laser beam and one illumination beam are combined, comprising:
    a reflective surface for the reflection of the illumination beam, the reflective surface presenting an optical aperture through which the laser beam passes;
    wherein the optical aperture through which the laser beam passes is sized and positioned such that an image of the optical aperture appears projected on the retina as a relatively dark area in which the laser beam is directed such that the relatively dark area is usable as guidance for directing the laser beam onto the retina.

2. The applicator for an ophthalmologic treatment device, according to claim 1, wherein the reflective surface is oriented at a first angle relative to the at least one laser beam and the illumination beam, the first angle being about half of a second angle spanning between the at least one laser beam and the illumination beam.

3. The applicator for an ophthalmologic treatment device, according to claim 1, wherein the reflective surface is oriented at an angle of about forty five degrees relative to the at least one laser beam and the illumination beam.

4. The applicator for an ophthalmologic treatment device, according to claim 1, wherein the optical aperture is defined by the reflective surface as a hole for the at least one laser beam to pass through.

5. The applicator for an ophthalmologic treatment device, according to claim 4, wherein the hole is elliptical in shape.

6. The applicator for an ophthalmologic treatment device, according to claim 1, wherein the reflective surface comprises a reflection coating and the reflection coating defines an uncoated area for the optical aperture.

7. The applicator for an ophthalmologic treatment device, according to claim 6, wherein the uncoated area is elliptical in shape.

8. An ophthalmologic treatment or diagnostic device, comprising:
    an applicator wherein at least one laser beam and one illumination beam are combined;
    the applicator comprising a reflective surface for the reflection of the illumination beam, the reflective surface presenting an optical aperture through which the laser beam passes;
    wherein the optical aperture through which the laser beam passes is sized and positioned such that an image of the optical aperture appears projected on the retina as a relatively dark area to which the laser beam is directed such that the relatively dark area is usable as guidance for directing the laser beam onto the retina.

9. The ophthalmologic treatment or diagnostic device, according to claim 8, wherein the reflective surface is oriented at a first angle relative to the at least one laser beam and the illumination beam, the first angle being about half of a second angle that spans between the at least one laser beam and the illumination beam.

10. The ophthalmologic treatment or diagnostic device, according to claim 8, wherein the reflective surface is oriented at an angle of about forty five degrees relative to the at least one laser beam and the illumination beam.

11. The ophthalmologic treatment or diagnostic device, according to claim 8, wherein the optical aperture is defined by the reflective surface as a hole for the at least one laser beam to pass through.

12. The ophthalmologic treatment or diagnostic device, according to claim 11, wherein the hole is elliptical in shape.

13. The ophthalmologic treatment or diagnostic device, according to claim 8, wherein the reflective surface comprises a reflection coating and the reflection coating defines an uncoated area for the optical aperture.

14. The ophthalmologic treatment or diagnostic device, according to claim 13, wherein the uncoated area is elliptical in shape.

15. An Indirect Ophthalmoscope, comprising;
    a light emitting diode (LED) or any other light source to produce an illumination light;
    a mirror with an optical aperture; and
    a socket for a connector to an optical fiber coupled to a source of laser light;
    wherein the mirror is arranged to coaxially combine the illumination light and laser light from the optical fiber guided through the optical aperture;
    wherein the optical aperture through which the laser light passes is sized and positioned such that an image of the optical aperture appears projected on the retina as a relatively dark area to which the laser light is directed such that the relatively dark area is usable as guidance for directing the laser light onto the retina.

16. The indirect ophthalmoscope according to claim 15, wherein the reflective surface is oriented at a first angle relative to the at least one laser beam and the illumination beam, the first angle being about half of a second angle that spans between the at least one laser beam and the illumination beam.

17. The indirect ophthalmoscope according to claim 15, wherein the reflective surface is oriented at an angle of about forty five degrees relative to the at least one laser beam and the illumination beam.

18. The indirect ophthalmoscope according to claim 15, wherein the optical aperture is defined by the reflective surface as a hole for the at least one laser beam to pass through.

19. The indirect ophthalmoscope according to claim 18, wherein the hole is elliptical in shape.

20. The indirect ophthalmoscope according to claim 15, wherein the reflective surface comprises a reflection coating and the reflection coating defines an uncoated area for the optical aperture.

21. The indirect ophthalmoscope according to claim 20, wherein the uncoated area is elliptical in shape.

* * * * *